2,769,780
PRECIPITATION PROCESS

Warren E. Clifford, San Francisco, Calif., and Raymond E. Burns, Richland, Wash., assignors to the United States of America as represented by the United States Atomic Energy Commission No Drawing. Application December 22, 1954,
Serial No. 477,144

8 Claims. (Cl. 210—23)

This invention deals with the separation and/or recovery of cesium values and/or strontium values from aqueous solutions by precipitation.

In processing neutron-irradiated uranium, for instance by precipitation or extraction of the uranium and the plutonium from aqueous solutions of the irradiated uranium, aqueous waste solutions are usually obtained which contain the bulk of the fission products formed during irradiation. Disposal of these waste solutions has been quite a problem; one process frequently used is the conversion of the aqueous solutions to a solid mass in order to reduce the volume and then placing the mass into tanks or other containers and burying the latter underground. The use of tanks makes this waste disposal rather expensive, and attempts have therefore been made to devise a more economical method.

It has been observed in some geographical areas that most of the fission products are pretty well absorbed by the soil and held there for a considerable period of time so that, by the time they enter the ground water and from there rivers, most of the radioactive elements have decayed to a safe level of activity. The aqueous waste solutions could therefore be safely poured into the ground in regard to health hazards were it not for two elements which have an especially long half-life, namely, $Cs^{137}$ (half-life 37 years) and $Sr^{90}$ (half-life 20 years); these two elements are present in a considerable amount in waste solutions of the described origin. For instance, in an aqueous waste solution derived from neutron-irradiated uranium, after storage of the solution for six years, 98% of the radioactivity was due to cesium.

Another reason for removing and recovering cesium and/or strontium from such waste solutions is that as gamma and beta emitters they are useful for food sterilization, for the polymerization of organic hydrocarbons, for the production of mobile, high-voltage, low-current sources (atomic batteries), in radiotherapy and radiography. The cesium and the strontium represent sources for gamma and beta rays of rather constant strength due to their long half-lives.

It is an object of this invention to provide a process for the separation of cesium and/or strontium values from aqueous solutions by precipitation which can be carried out from an alkaline solution.

It is another object of this invention to provide a process for the separation of cesium and/or strontium values from aqueous solutions by precipitation which, because it is operative in alkaline solutions, does not involve any corrosion problems in regard to the equipment used for the process.

It is also an object of this invention to provide a process for the separation of radioactive fission products from aqueous solutions whereby the fission products are recovered in an unbulky form and thus occupy a comparatively small space which makes disposal of the fission products relatively inexpensive.

These objects are accomplished by providing a precipitate of a metal ferrocyanide in the aqueous solutions to be treated whereby the fission products to be separated are carried on said precipitate, said metal being selected from the group consisting of nickel and cobalt; and removing said precipitate from said solutions.

While cobalt and nickel are the preferred metals for forming the ferrocyanide precipitate because they proved the most effective, the copper and manganese ferrocyanides are also operative. While cobalt and nickel ferrocyanides remove cesium satisfactorily at a pH value up to between 10 and 11, the pH value cannot be higher than 8 in the case of a cupric ferrocyanide. Moreover, when cupric ferrocyanide containing cesium is in contact with the solution for too long a time, desorption occurs whereby the efficiency is noticeably impaired. This is not true for the cobalt or nickel ferrocyanides. The decontamination factor (amount in the initial solution/amount in solution after precipitation) obtained with manganese ferrocyanide was very much lower than the corresponding values obtained with the cobalt and nickel precipitates.

Precipitation of cesium values is best if carried out at room temperature (about 25° C.), and maintaining such a low temperature is especially essential if the pH value of the solution is higher than 10. However, strontium precipitation is improved with increasing temperature of the solution.

The precipitate of the ferrocyanide is preferably formed in the solution by adding an alkali ferrocyanide, for instance potassium ferrocyanide, and a water-soluble metal salt, such as cobalt nitrate, cobalt sulfate, nickel nitrate or nickel sulfate, to the solution. A concentration of each, the alkali ferrocyanide and the metal salt, of about 0.005 M in the solution has been found sufficient for most purposes.

While cesium removal from the solution is best at a pH value between 8 and 10 and decreases remarkably with increasing pH value, the strontium recovery proved better at pH values higher than 10. In order to recover both cesium and strontium from an aqueous solution, best results are therefore obtained by first adjusting the pH value to between 8 and 10, removing the cesium by providing a ferrocyanide precipitate and separating the precipitate, then adjusting the pH value to about 11, or above and providing a new quantity of metal ferrocyanide precipitate which then carries the strontium, and separating this second precipitate from the solution. The second precipitation step is still furthermore improved if carried out at elevated temperature.

The "carrying" of cesium and strontium is improved by subjecting the solution with the ferrocyanide precipitate to agitation and furthermore by allowing the precipitate to remain in the solution for some time, for instance for a few days. This, for example, is obvious from the table of Example I given later.

If the precipitation is to be carried out from an acid solution, best recovery is obtained if the metal salt is added to the solution prior to the alkali ferrocyanide. In contra-distinction thereto, precipitation from an alkaline solution (the preferred embodiment of the invention) was found to be more complete and less digestion time to be necessary when the alkali ferrocyanide was added to the solution prior to incorporation of the metal salt.

The metal values can be recovered from the metal ferrocyanide precipitate by any methods known to those skilled in the art. Cesium, for instance, may be separated from the metal ferrocyanide by pyrolysis accomplished by heating the precipitate in air to between 500 and 600° C.; the residue is then leached with water and the aqueous solution formed thereby evaporated to dryness.

In the following, a few examples are given which are to illustrate the process of this invention without limiting the invention to the details given therein.

Example I

An aqueous synthetic waste solution had the following composition: 2.6 M in $H^+$, 2.8 M in $Na^+$, 0.017 M in $Fe^{++}$, 0.034 M in $NH_4^+$, 0.214 M in $SO_4^=$, 0.179 M in $PO_4^\equiv$, 4.45 M in $NO_3^-$, and $2 \times 10^{-5}$ M in nonradioactive cesium; it also contained $Cs^{134}$ in a concentration of $1.8 \times 10^5$ C./m./ml. Aliquots of this solution were used for a number of tests, each employing a different metal for forming the ferrocyanide precipitate. A 50% solution of sodium hydroxide was first added to the samples in order to adjust the pH to a value of 10.2. Thereafter potassium ferrocyanide, as a 0.5 M aqueous solution, was added until a concentration of 0.0024 M was obtained in the solution, except in the case of the "manganese test" where the potassium ferrocyanide concentration was 0.0048 M. Thereafter the metal ion was added in the form of a sulfate solution in a quantity to yield the concentrations indicated in the table below. The slurries formed thereby were stirred for a short time and then allowed to settle; the supernatant in each case was analyzed for its cesium content after various periods of time. The results are compiled in the table below.

| Metal Ion | Concn. of Metal Ion, M | Cesium Decontamination Factors After— | | | |
|---|---|---|---|---|---|
| | | 3.3 hrs. | 1 day | 9 days | 20 days |
| $Fe^{++}$ | 0.017 | 1 | 1.8 | | 6.6 |
| $Cu^{++}$ | 0.01 | 4 | 5 | 7 | 16 |
| $Co^{++}$ | 0.01 | 180 | 880 | [1] >2,000 | >2,000 |
| $Ni^{++}$ | 0.01 | 140 | 230 | >2,000 | >2,000 |
| | | 1 hr. | 3 days | 12 days | |
| $Mn^{++}$ | 0.005 | 11 | 40 | 40 | 44 |

[1] DF's above 2,000 uncertain because of analytical limitations.

It is obvious from this table that the cobalt and nickel ferrocyanides are radically superior to the other cyanides tested in this example.

Example II

The same solution was used for this example as was used in Example I. Four runs were made; in each sample potassium ferrocyanide was added in a quantity so as to yield a concentration in the solution of 0.0025 M. Thereafter the pH was adjusted with a 50% sodium hydroxide solution, in each run to a different value, and at the same time the temperature was raised to 75° C. within four hours. Thereafter nickel sulfate was added, also in a quantity to yield a concentration of 0.0025 mole/liter of waste solution. The slurry formed was stirred for a few minutes and then allowed to settle. The results of these four runs are shown in the following table.

| pH | | Gross DF [1] after— | | Cs-DF [1] after 5 days |
|---|---|---|---|---|
| Initial | After 5 days | 1 day | 5 days | |
| 8.1 | 7.8 | 106 | 112 | 1,800 |
| 9.4 | 8.7 | 77 | 63 | 580 |
| 10.2 | 9.7 | 52 | 33 | 530 |
| 11.1 | 11.2 | 1.1 | 1.1 | 1.2 |

[1] Decontamination factor.

These experiments proved that the cesium is best carried at a pH between 8 and about 10 and that it then radically decreases and becomes almost negligibly low at a pH of 11.1.

Example III

In the following example the effect is shown which the length of contact time between precipitate and supernatant has, at various pH values, on the decontamination factors.

The solution used in this instance had the following composition.

| | $\beta$c./m./ml.[1] | $\beta\mu$c./ml.[2] | $\gamma$c./m./ml.[3] | $\gamma\mu$c./ml.[4] |
|---|---|---|---|---|
| Gross $\beta$ | $3.7 \times 10^6$ | 23 | | |
| Gross $\gamma$ | | | $5.3 \times 10^6$ | 24 |
| Cs | $3.8 \times 10^6$ | 23 | $5.0 \times 10^6$ | 23 |
| Ru | $5.7 \times 10^4$ | 0.35 | $4.4 \times 10^4$ | 0.2 |
| Y | $1.6 \times 10^3$ | 0.009 | | |
| Rare Earths—Ce | $1.6 \times 10^3$ | 0.009 | <100 | <0.0005 |
| Sr | $2.9 \times 10^3$ | 0.018 | | |
| Ce | 36 | 0.0002 | Negligible | Negligible |

[1] All $\beta$ counts on 2d shelf, no absorber.
[2] Assuming 7.5% geometry.
[3] All $\gamma$ counts on contact position gamma scintillation counter.
[4] Assuming 10% geometry.

To this solution a 5 M nitric acid was added in order to adjust the pH to the values desired. Thereafter potassium ferrocyanide and metal nitrate were added, in each instance in quantities to yield concentrations of 0.01 M of each. After formation of the precipitates the slurries were stirred for one hour at room temperature and then allowed to settle. The decontamination factors obtained after various settling times at the various pH values and with ferrocyanides of different metals are listed in the table below.

| Metal Ion | pH | Settling Time, hrs. | Decontamination Factors | | | | |
|---|---|---|---|---|---|---|---|
| | | | Gross $\beta$ | Gross $\gamma$ | Cs | Ru | Sr |
| $Cu^{++}$ | 7 | 17 | 270 | 450 | | | |
| | | 65 | 290 | 520 | | | |
| | | 185 | 310 | 610 | | | |
| | | 380 | 310 | 500 | 7,000 | 19 | 175 |
| | | 470 | 290 | 640 | | | |
| | | 900 | 320 | 700 | | | |
| $Cu^{++}$ | 8 | 23 | 130 | 200 | | | |
| | | 120 | 91 | 120 | | | |
| | | 290 | 52 | 58 | 160 | 4.2 | 440 |
| | | 550 | 45 | 48 | 160 | 2.7 | 240 |
| $Ni^{++}$ | 8 | 18 | 190 | 640 | | | |
| | | 90 | 280 | 610 | | | |
| | | 165 | 280 | 500 | | | |
| $Ni^{++}$ | 10 | 18 | 78 | 130 | | | |
| | | 89 | 120 | 300 | | | |
| | | 260 | 130 | 280 | | | |
| | | 520 | 120 | 270 | | | |
| | | 840 | 120 | 280 | | | |
| $Ni^{++}$ | 11 | 1.2 | | | | | |
| | | 68 | 33 | 35 | | | |
| | | 144 | 42 | 47 | | | |
| $Co^{++}$ | 10 | 4 | | | | | |
| | | 72 | 100 | 220 | | | |
| | | 240 | 105 | 240 | | | |
| | | 500 | 103 | 240 | | | |
| | | 820 | 100 | 200 | | | |

Gross beta and gamma decontamination factors remained constant over a long settling period for copper ferrocyanide at pH=7, but they decreased markedly at pH=8 which indicates desorption of cesium. Similar desorption from nickel and cobalt ferrocyanides did not occur.

Example IV

Six samples of an acidic waste solution containing cesium in a quantity of $4.7 \times 10^6$ $\beta$ c./m./ml. were made 0.005 M in potassium ferrocyanide, then neutralized with sodium hydroxide solution to various pH values; thereafter they were made 0.005 M in nickel sulfate and then agitated thoroughly and allowed to settle. The pH values ranged between 8.75 and 12.5. The decontamination factors obtained thereby are given in the table below.

| Sample | pH | Cs, $\beta$ c./m./ml. | Decontamination Factor for Cs |
|---|---|---|---|
| 1 | 12.5 | $3.9 \times 10^6$ | 1.2 |
| 2 | 12.5 | $3.9 \times 10^6$ | 1.2 |
| 3 | 12.5 | $3.7 \times 10^6$ | 1.3 |
| 4 | 10.2 | $1.3 \times 10^3$ | 3,600 |
| 5 | 8.75 | 700 | 6,800 |
| 6 | 9.75 | 320 | 15,000 |

These experiments show that cesium precipitation is best at a pH between about 8 and 10.

While the invention has been described mainly with examples which use fission product-containing solutions, it will be understood that the invention is equally well suitable for the recovery of alkali and alkaline earth metal values from aqueous solutions of different origin, for instance from solutions obtained in the processing of ores.

It will also be understood that this invention is not to be limited to the details given herein but that it may be modified within the scope of the appended claims.

What is claimed is:

1. The process of removing metal values selected from the group consisting of cesium values and strontium values from an aqueous solution comprising providing in said aqueous solution a precipitate selected from the group consisting of nickel ferrocyanide and cobalt ferrocyanide whereby said metal values are carried on said precipitate, and removing said precipitate from said solution.

2. The process of claim 1 wherein said metal values are cesium values and the aqueous solution has a pH value between 8 and 10.

3. The process of claim 2 wherein the solution has room temperature.

4. The process of claim 1 wherein said metal values are strontium values and the pH value of the solution is between 8 and about 11.

5. The process of claim 4 wherein the pH value is about 11 and the solution has a temperature of approximately 75° C.

6. The process of removing fission product values selected from the group consisting of cesium values and strontium values from aqueous solutions comprising adjusting the pH to a value between 8 and 11, adding alkali ferrocyanide to said solution, adding a water-soluble metal salt selected from the group consisting of cobalt salt and nickel salt to said solution whereby a precipitate forms and fission product values are carried on said precipitate, and separating the precipitate from the solution.

7. The process of claim 6 wherein the alkali ferrocyanide and the metal salt are added in a quantiy to yield a concentration in the solution of about 0.005 M.

8. The process of removing cesium values and strontium values from aqueous solutions comprising adjusting the pH of the solution to a value of between 8 and 10, adding potassium ferrocyanide to said solution in a quantity to yield a concentration of about 0.005 M, adding nickel sulfate to said solution in a quantity to correspond to a concentration in the aqueous solution of 0.005 M whereby a precipitate forms which carries most of the cesium values and part of the strontium values originally present, separating the precipitate from the solution, adding sodium hydroxide to said solution to increase the pH value to about 11, adding potassium ferrocyanide to the solution in a quantity to yield a concentration of about 0.005 M, adding nickel sulfate in a quantity to correspond to a concentration of about 0.005 M while simultaneously heating the solution to approximately 75° C. whereby a precipitate forms which carries the bulk of the strontium values that had remained in the solution, and removing the precipitate from the solution.

No references cited.